(12) United States Patent
Kosaka et al.

(10) Patent No.: US 8,459,144 B2
(45) Date of Patent: Jun. 11, 2013

(54) BICYCLE SHIFTER

(75) Inventors: Kentaro Kosaka, Osaka (JP);
Yoshimitsu Miki, Osaka (JP); Toshihiko Takeuchi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/248,179

(22) Filed: Sep. 29, 2011

(65) Prior Publication Data

US 2013/0081505 A1 Apr. 4, 2013

(51) Int. Cl.
*F16C 1/10* (2006.01)
*B62K 25/02* (2006.01)
*G05G 11/00* (2006.01)
*F16H 63/42* (2006.01)

(52) U.S. Cl.
USPC ......... 74/502.2; 74/473.14; 74/489; 116/28.1

(58) Field of Classification Search
USPC ........ 74/502.2, 501.6, 473.14, 489; 116/28.1, 116/291
See application file for complete search history.

(56) References Cited

U.S. PATENT DOCUMENTS

| | | | |
|---|---|---|---|
| 5,325,735 A | | 7/1994 | Nagano |
| 5,701,786 A | * | 12/1997 | Kawakami ................ 74/502.2 |
| 6,295,876 B1 | * | 10/2001 | Busch ............................ 73/740 |
| 6,880,425 B2 | * | 4/2005 | Shahana ..................... 74/502.2 |
| 2002/0189524 A1 | * | 12/2002 | Chen ............................ 116/28.1 |
| 2007/0068316 A1 | | 3/2007 | Kawakami et al. |
| 2007/0137384 A1 | | 6/2007 | Kawakami |
| 2007/0193389 A1 | | 8/2007 | Kawakami |
| 2008/0257098 A1 | | 10/2008 | Kawakami |
| 2009/0158881 A1 | | 6/2009 | Shahana |
| 2009/0308194 A1 | | 12/2009 | Shahana |
| 2009/0314117 A1 | | 12/2009 | Kawakami |
| 2010/0071498 A1 | | 3/2010 | Kawakami |
| 2010/0199795 A1 | | 8/2010 | Kawakami |
| 2010/0308246 A1 | * | 12/2010 | Witkowski et al. ........ 251/249.5 |

FOREIGN PATENT DOCUMENTS

EP 1 764 298 A1 3/2007

* cited by examiner

*Primary Examiner* — Richard W L Ridley
*Assistant Examiner* — Richard V Wu
(74) *Attorney, Agent, or Firm* — Global IP Counselors

(57) ABSTRACT

A bicycle shifter is provided with a shifter housing, a winding member and an indicator unit. The winding member is movably coupled to the shifter housing. The indicator unit includes an indicating member and an adjustment member. The indicating member is operatively and adjustably connected to the winding member. The adjustment member adjusts a position of the indicating member relative to the winding member.

18 Claims, 9 Drawing Sheets

BICYCLE SHIFTER

BACKGROUND

1. Field of the Invention

This invention generally relates to a bicycle shifter. More specifically, the present invention relates to a bicycle shifter having an indicator unit.

2. Background Information

Most bicycles are provided with a drive train having multiple gears that allows the rider to select a particular gear for a particular situation. A bicycle shifter is usually provided for the rider to manually change gears of the drive train. Many bicycle shifters are provided with a gear position indicator to inform the rider of the current gear selection. In the case of mechanical operated bicycle shifter, a mechanical gear position indicator is often used to indicate the gear position of the drive train. Some of these mechanical gear position indicators are operated by a cable that is connected to the bicycle shifter, while others of these mechanical gear position indicators are mounted directly on the bicycle shifter. Typically, a separate gear position indicator is provided for each of the bicycle shifters.

In most cases, the gear position indicator is coupled to the take-up member of the bicycle shifter that winds up the inner wire of the shift control cable. One example of a gear position indicator is disclosed in U.S. Pat. No. 5,325,735 (assigned to Shimano inc.). The gear position indicator of this patent has an indicating member mount to a wire takeup reel for indicating a current gear position with respect to markings on a dial that is located above the indicating member. One problem with this gear position indicator is that the indicator member can become misaligned with the markings on the dial. This gear position indicator does not have any adjustment mechanism for compensating for the indicating member becoming misaligned from the markings on the dial. Thus, the gear position indicator must be disassembled to realign the indicating member with the markings on the dial.

SUMMARY

One aspect present in this disclosure is to provide a bicycle shifter with an indicator unit that includes an adjustment member for adjusting an indicating member.

In view of the state of the known technology, a bicycle shifter comprises a shifter housing, a winding member and an indicator unit. The winding member is movably coupled to the shifter housing. The indicator unit includes an indicating member and an adjustment member. The indicating member is operatively and adjustably connected to the winding member. The adjustment member adjusts a position of the indicating member relative to the winding member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
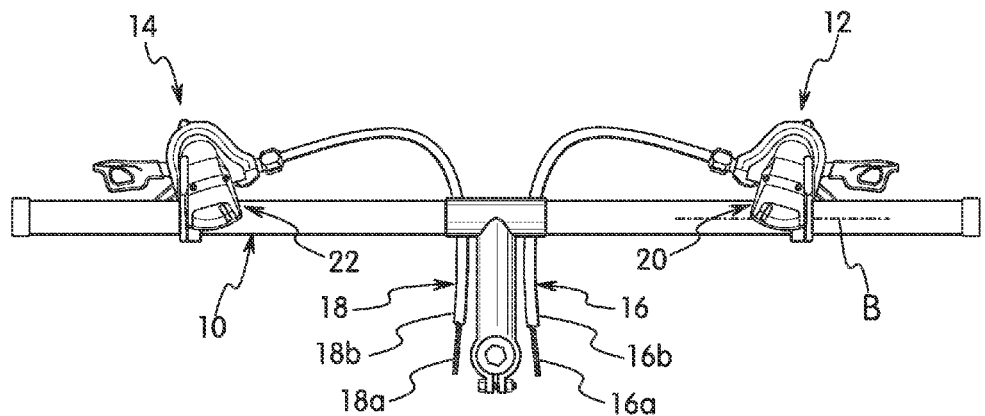
FIG. 1 is a top plan view of a bicycle handlebar that having two bicycle shifters that are each equipped with an indicator unit in accordance with one embodiment.

Referring initially to FIG. 1, a bicycle handlebar 10 is illustrated that is provided with a right bicycle shifter 12 and a left bicycle shifter 14 in accordance with a first embodiment. One of the bicycle shifters 12 and 14 is operatively coupled to a rear gear changing device (not shown) via a first shift control cable 16, while the other one of the bicycle shifters 12 and 14 is operatively coupled to a front gear changing device (not shown) via a second shift control cable 18. The gear changing devices are part of a conventional bicycle driving system that is used to shift a bicycle chain for changing speeds of a drive train (not shown) in a relatively conventional manner. Thus, the gear changing devices will not be shown or described herein.

Preferably, the shift control cables 16 and 18 are conventional bicycle operating cables that have an outer case covering an inner wire. In other words, each of the shift control cables 16 and 18 is a Bowden type cable that basically includes an inner wire slidably received within an outer case. For example, as seen in FIG. 1, the shift control cable 16 has an inner wire 16a with an outer case 16b covering the inner wire 16a, while the shift control cable 18 has an inner wire 18a with an outer case 18b covering the inner wire 18a.

As seen in FIG. 1, the bicycle shifter 12 includes an indicator unit 20 for indicating a current gear position of the gear changing device that is coupled to the bicycle shifter 12 via the shift control cable 16. Similarly, the bicycle shifter 14 includes an indicator unit 22 for indicating a current gear position of the gear changing device that is coupled to the bicycle shifter 14 via the shift control cable 18. The indicator unit 22 is a mirror image of the indicator unit 20. Accordingly, the indicator unit 22 operates in the same manner as the indicator unit 20, which is discussed below. Since the indicator units 20 and 22 operate in the same manner, only the indicator unit 22 will be discussed below for the sake of brevity.

Also in the illustrated embodiment, the right and left bicycle shifters 12 and 14 are essentially identical in operation, except that they are mirror images of each other, and they may have a different number of shift operations. In other words, the left bicycle shifter 14 is identical to the right bicycle shifter 12, except for the left bicycle shifter 14 has been modified to be a mirror image and the number of gears that can be shifted has been changed. Thus, for the sake of brevity, only the right bicycle shifter 12 will be discussed and illustrated herein.

As seen in FIGS. 2 to 5, the bicycle shifter 12 includes a shifter housing 24 in which a clamp 26 and a cable adjusting unit 28 are fixed thereto. The clamp 26 releasably mounts the bicycle shifter 12 to the handlebar 10 in a conventional manner. The clamp 26 has a curved clamping surface that defines a handlebar band clamping axis B. The cable adjusting unit 28 is used to adjust the shift control cable 16 in a conventional manner. The clamp 26 and the cable adjusting unit 28 are conventional structures that are commonly used with shifters. Thus, for the sake of brevity, the clamp 26 and the cable adjusting unit 28 will not be discussed or illustrated in detail herein.

Figure 4:
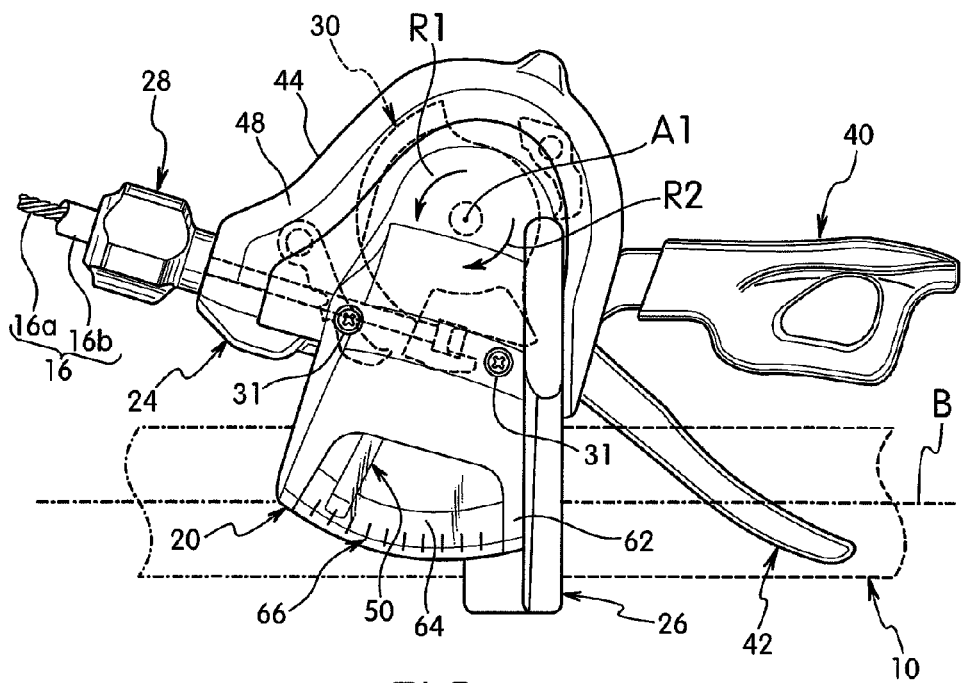
FIG. 4 is a top plan view of the right bicycle shifter illustrated in FIGS. 1 to 3, with the winding member shown in dashed lines.
Figure 5:
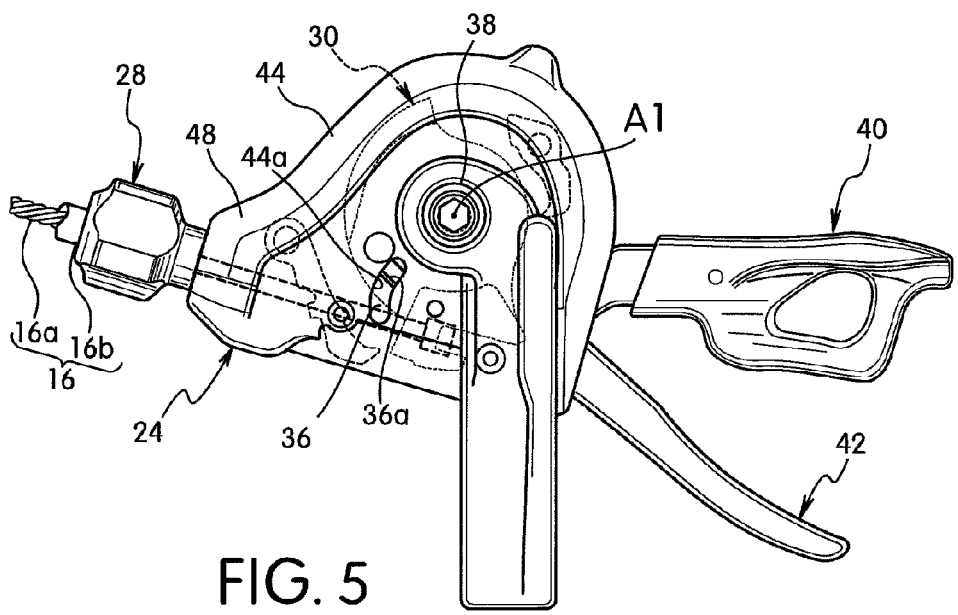
FIG. 5 is a top plan view of the right bicycle shifter illustrated in FIGS. 1 to 4, but with the indicator unit removed.
Figure 6:
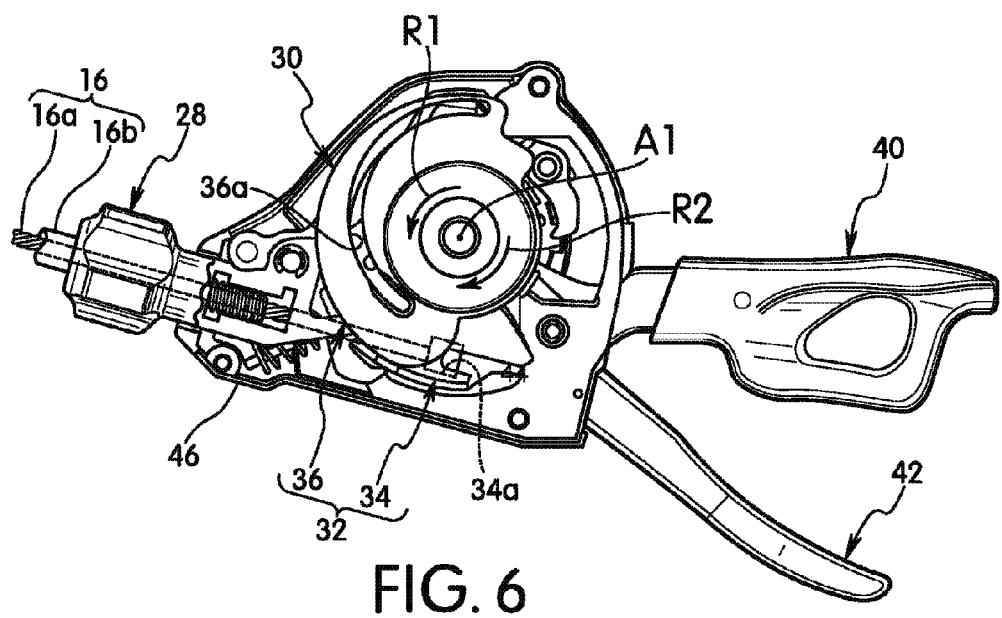
FIG. 6 is a top plan view of the right bicycle shifter illustrated in FIGS. 1 to 5, but with the indicator unit and a top housing part of the shifter housing removed.

As seen in FIGS. 4 to 6, the bicycle shifter 12 includes a shift unit 30 that pulls and releases the inner wire 16a in a conventional manner. The indicator unit 20 is typically configured and calibrated for a particular shift unit and a particular gear changing device to accurately indicate a current speed or gear of the gear changing device. However, the indicator unit 20 of the bicycle shifter 12 is not limited to indicating a current speed or gear of a cable operated gear changing device (e.g., derailleur). The indicator unit 20 of the bicycle shifter 12 can be used to indicate a current speed or gear of other types of gear changing devices as needed and/or desired.

Figure 3:
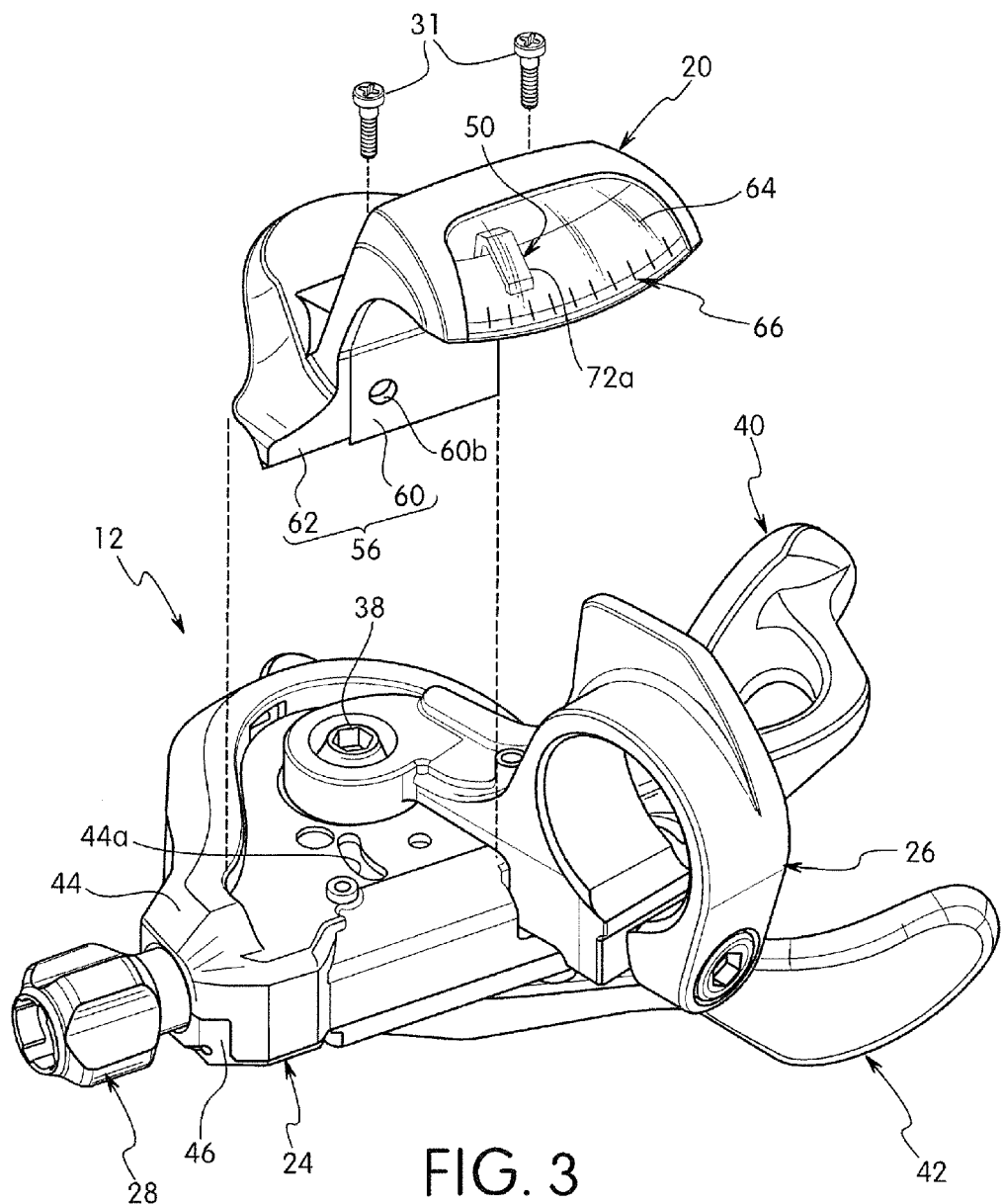
FIG. 3 is a top perspective view of the right bicycle shifter illustrated in FIGS. 1 and 2, but with the indicator unit shown in a detached state.

As seen in FIGS. 3 and 4, the indicator unit 20 is an integrated unit that is detachably and reinstallably coupled to the shifter housing 24 by a pair of screws 31. With the indicator unit 20 removed from the shifter housing 24, the shift unit 30 of the bicycle shifter 12 remains completely operable. The bicycle shifter 12 can be used without the indicator unit 20 by using a replacing cover (not shown) in place of the indicator unit 20, if desired. The indicator unit 20 can be used with a variety of shift units that have a part that moves an inner wire. In other words, the shift unit 30 can be any type of the shift unit that includes a part that pulls and releases the inner wire 16a. For this reason, the shift unit 30 of the bicycle shifter 12 will not be shown or described in detail.

In the illustrated embodiment, as seen in FIG. 6, the bicycle shifter 12 includes a winding member 32, which is a part of the shift unit 30 that moves with the inner wire 16a. In particular, the winding member 32 of the shift unit 30 includes a wire takeup member 34 and a control plate 36. The wire takeup member 34 and the control plate 36 are disposed inside of the shifter housing 24 such that the winding member 32 is movably coupled to the shifter housing 24.

The wire takeup member 34 has a cable attachment structure 34a (e.g., a notch) formed at the peripheral edge of the wire takeup member 34 for directly attaching the nipple of the inner wire 16a to the wire takeup member 34. In this way, the inner wire 16a has one end attached to the wire takeup member 34. The inner wire 16a can be pulled and wound on the peripheral edge of the wire takeup member 34 as the winding member 32 rotates in a first rotational direction R1. The inner wire 16a can be released and unwound from the peripheral edge of the wire takeup member 34 as the winding member 32 rotates in a second rotational direction R2, which is opposite to the first rotational direction R1 with respect to the winding pivot axis A1 of the winding member 32.

The control plate 36 is fixed on top of the wire takeup member 34 so that they move together. For example, in the illustrated embodiment, the wire takeup member 34 has a hole not shown and the control plate 36 has a pin (not shown) extending from the bottom surface of the control plate 36 into the hole of the wire takeup member 34 so that the move together about a winding pivot axis A1 of the winding member 32. The wire takeup member 34 and the control plate 36 are held together in the axial direction of the winding pivot axis A1 by a main axle bolt 38 (FIG. 5). The main axle bolt 38 is also used for attaching the handlebar band clamp 26 in the illustrated embodiment. In this way, the wire takeup member 34 and the control plate 36 are rotatably mounted with respect to the shifter housing 24 on the main axle bolt 38, which constitutes a pivot axle. Of course, various bushings (not shown) are provided on the main axle bolt 38 so that the wire takeup member 34 and the control plate 36 can rotate smoothly on the main axle bolt 38. Thus, the main axle bolt 38 has a center longitudinal axis that defines a winding pivot axis A1 of the winding member 32 such that the shifter housing 24 pivotally supports the winding member 32 about the winding pivot axis A1 of the winding member 32.

As seen in FIG. 6, in the illustrated embodiment, the control plate 36 is provided with a control groove 36a for operatively coupling the indicator unit 20 to the winding member 32 such that rotational movement of the winding member 32 is transmitted to the indicator unit 20. In the illustrated embodiment, the control groove 36a is a curved groove with its center of curvature offset from the winding pivot axis A1 of the winding member 32 as best seen in FIG. 6.

As seen in FIGS. 2 to 6, the shift unit 30 includes a release lever 40 and a winding lever 42 that are operatively coupled to the wire takeup member 34 by a positioning mechanism (not shown) to release and pull the inner wire 16a via the wire takeup member 34. As illustrated herein, the positioning mechanism can be, for example, a positioning mechanism that is used in one of Shimano's Rapid-fire type of shifters. Since these types of positioning mechanisms are well known, the positioning mechanism of the bicycle shifter 12 will not be shown or described in detail.

In the illustrated embodiment, as seen in FIGS. 3 and 5, the shifter housing 24 has an upper housing part 44 having a curved slot 44a for the indicator unit 20 to be operatively connected to the control plate 36 of the winding member 32 without disassembling the upper housing part 44 of the shifter housing 24 from a lower housing part 46 of the shifter housing 24. As a result, the indicator unit 20 can be easily detached and reinstalled without affecting the shift unit 30. The upper housing part 44 is releasably fastened to the lower housing part 46 by four screws (not shown).

Figure 7:
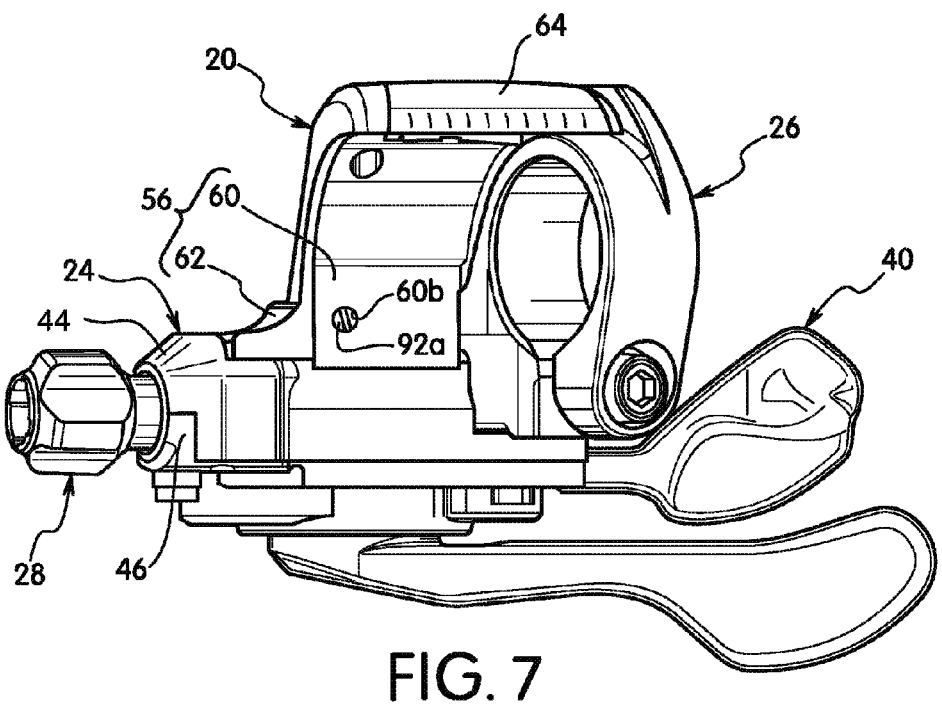
FIG. 7 is a side elevational view of the right bicycle shifter illustrated in FIGS. 1 to 4, which shows an access opening for accessing the adjustment member to adjust the indicator member position with respect to the indicator housing.

Turning now to mainly FIGS. 7 to 15, the indicator unit 20 will now be discussed in more detail. The indicator unit 20 is operatively and adjustably connected to the winding member 32 for indicating a current gear position of the winding member 32. As seen in FIG. 7, the indicator unit 20 is attached to the upper housing part 44 of the shifter housing 24 next to the handlebar band clamp 26. The indicator unit 20 is curved to overlie the handlebar 10.

Figure 8:
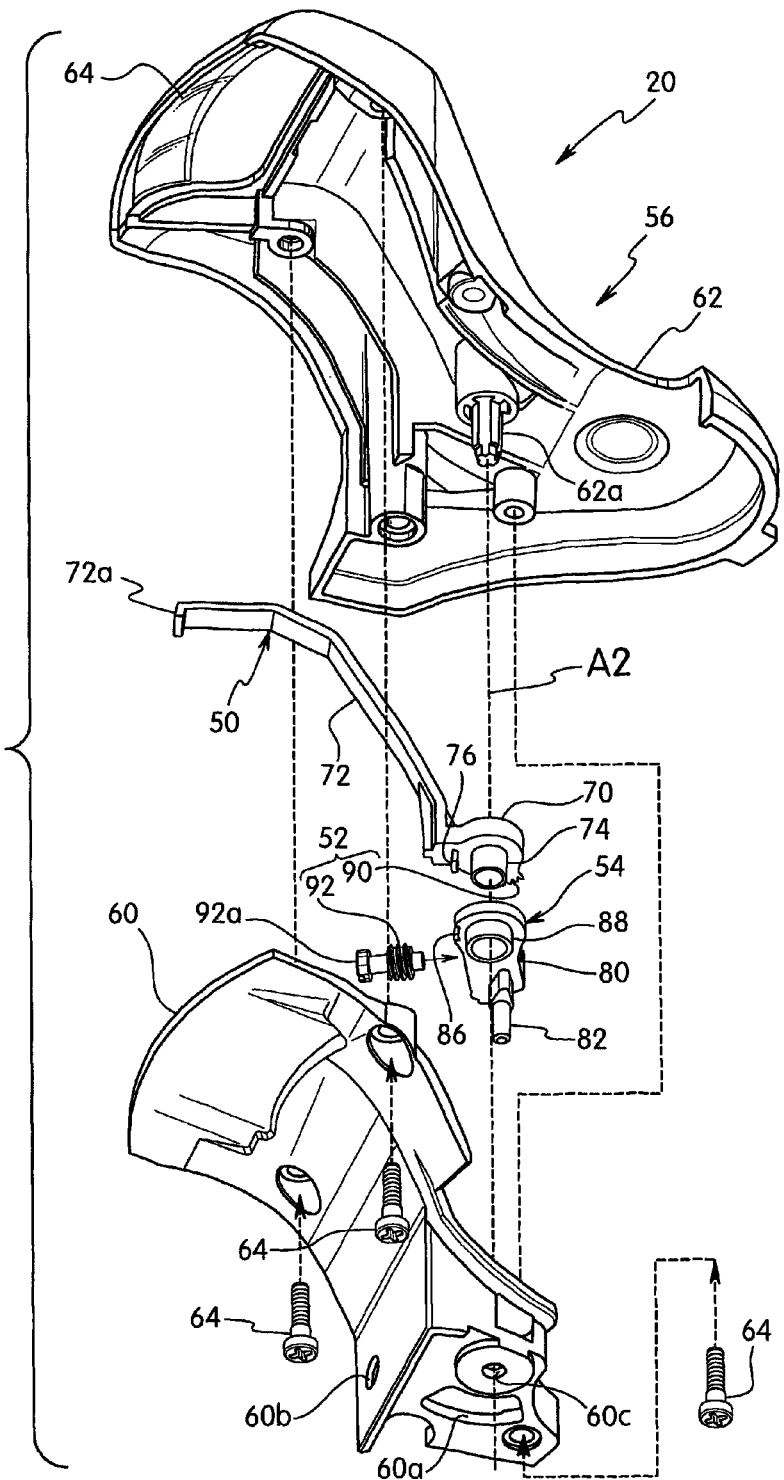
FIG. 8 is an exploded perspective view of the indicator unit of the right bicycle shifter illustrated in FIGS. 1 to 7.
Figure 9:
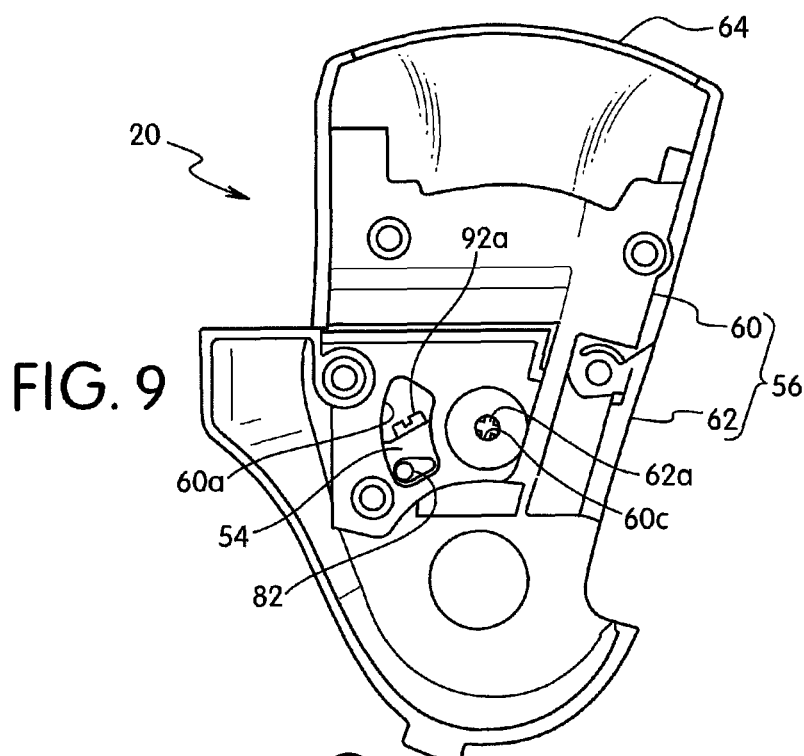
FIG. 9 is a bottom plan view of the indicator unit illustrated in FIG. 8.

As seen in FIG. 8, the indicator unit 20 includes an indicating member 50 for indicating a current gear position of the winding member 32 and an adjustment member 52 for adjusting an indicating position of the indicating member 50. The indicator unit 20 further includes a moving member 54 that is operatively coupled to the winding member 32 for transmitting movement of the winding member 32 to the indicating member 50. The indicator unit 20 further includes an indicator housing 56 that supports the indicating member 50, the adjustment member 52 and the moving member 54.

As seen in FIGS. 7 and 8, the indicator housing 56 basically includes an indicator base 60, an indicator cover 62 and an indicator lens 64. The indicator base 60 and the indicator cover 62 are releasably fastened together by three fasteners or screws 64. The indicator lens 64 is fixedly attached to the indicator cover 62 by adhesive or by using other bonding methods. The indicator base 60, the indicator cover 62 and the indicator lens 64 are preferably made of a hard, rigid material such as a rigid plastic material. In the illustrated embodiment, the indicator base 60, the indicator cover 62 and the indicator lens 64 are each formed by injection molding.

As seen in FIG. 8, the indicator base 60 is provided with a connection opening 60a through which the moving member 54 is operatively coupled to the winding member 32. Here, the connection opening 60a is a curved slot. As seen in FIGS. 7 and 8, the indicator base 60 is also provided with an access opening 60b for accessing the adjustment member 52. The access opening 60b is located such that the adjustment member 52 can be operated from outside of the indicator housing 56 via the access opening 60b such that the position of the indicating member 50 is adjusted without disassembling either the indicator housing 56 or the shifter housing 24. If desired, a plug can be provided for closing the access opening 60b. However, since the access opening 60b is provided on a handlebar facing surface of the indicator base 60, the handlebar 10 will cover the access opening 60b while the bicycle shifter 12 is mounted on the handlebar 10.

Figure 10:
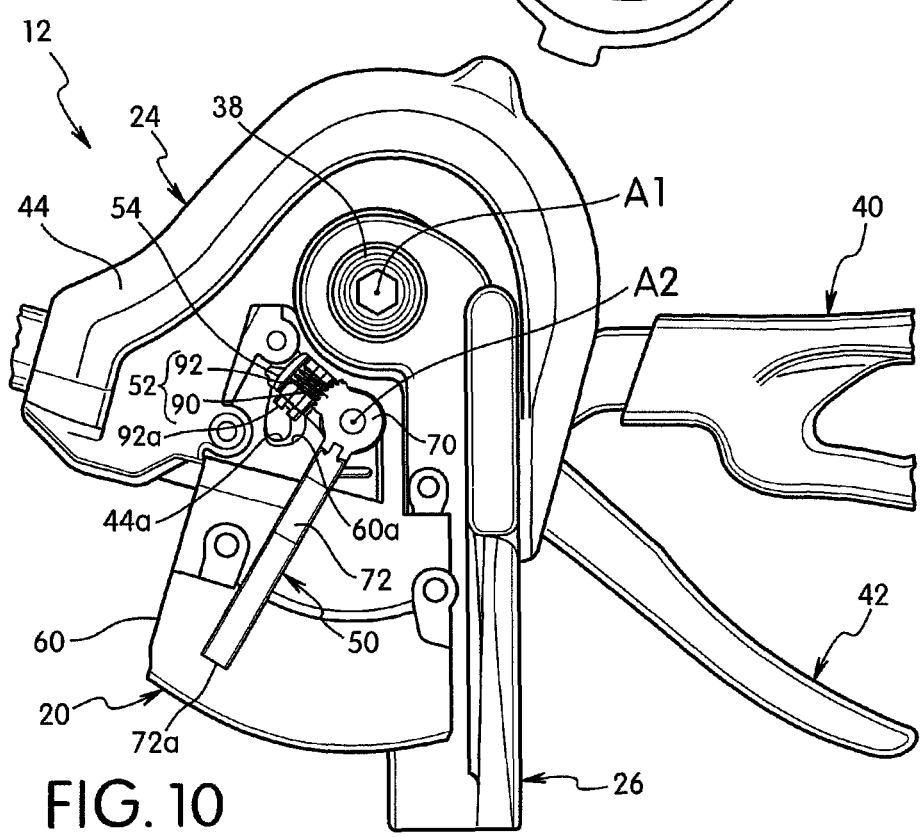
FIG. 10 is a top plan view of the indicator unit illustrated in FIGS. 8 and 9 disposed on the right bicycle shifter illustrated in FIGS. 1 to 7, but with the cover of the indicator unit removed.
Figure 11:
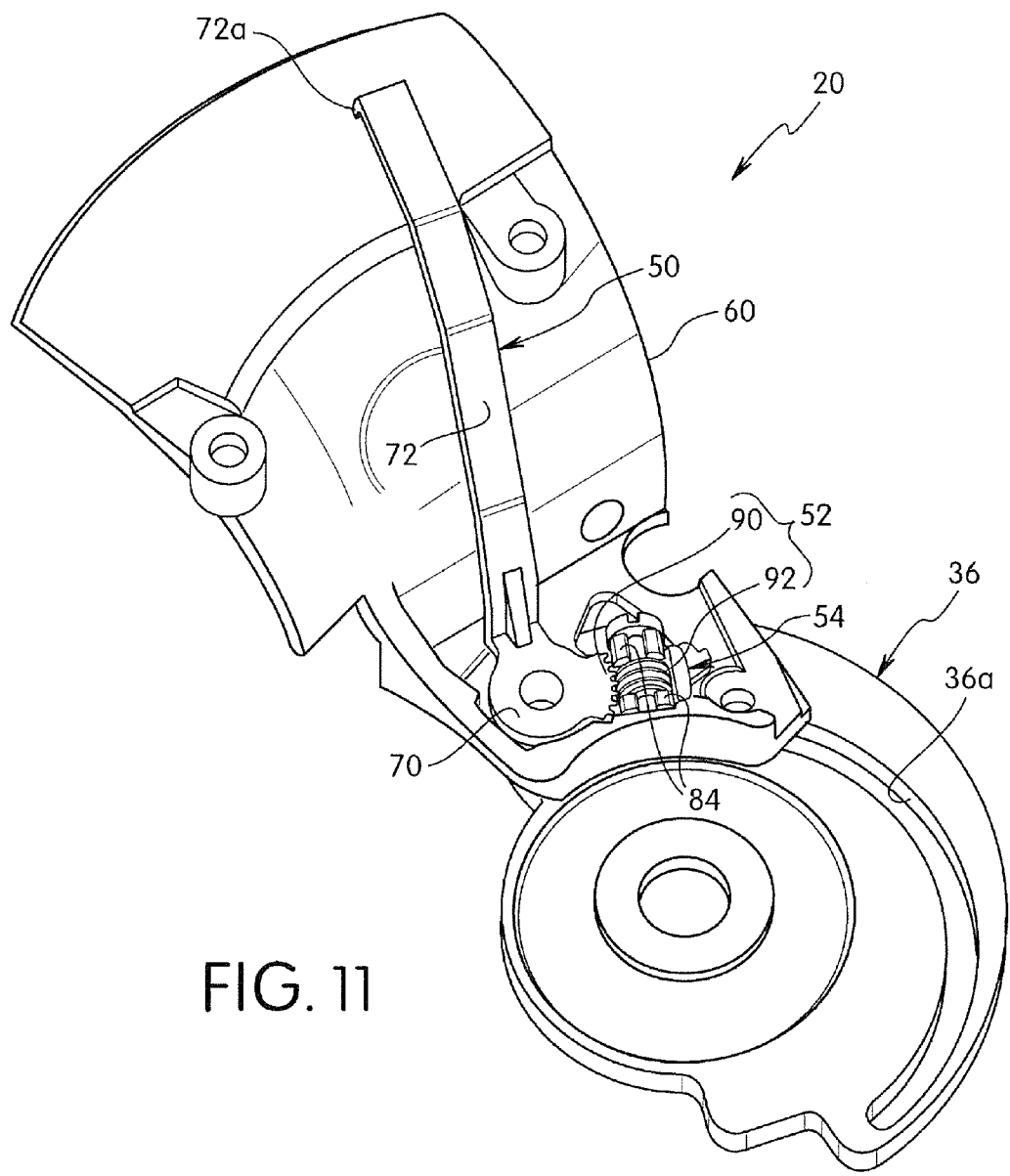
FIG. 11 is a top perspective view of the indicator unit illustrated in FIGS. 8 to 10 disposed on the right bicycle shifter illustrated in FIGS. 1 to 7, but with the cover of the indicator unit removed.
Figure 12:
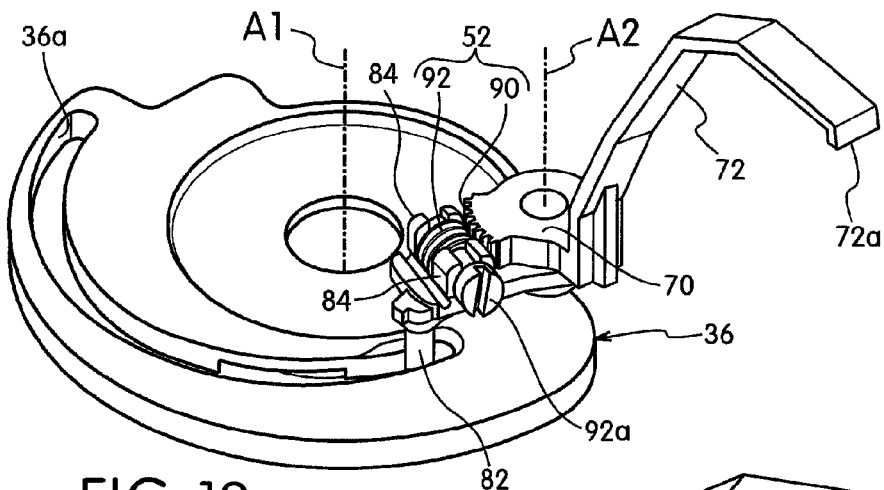
FIG. 12 is a top perspective view of the control plate of the winding member and selected parts of the indicator unit illustrated in FIGS. 8 to 11.

As seen in FIG. 8, the indicator cover 62 is provided with a support post 62a for pivotally supporting the indicating member 50, the adjustment member 52 and the moving member 54 within the indicator housing 56. The support post 62a extends into an opening 60c of the indicator base 60 and defines an indicator pivot axis A2. Thus, the indicator housing 56 pivotally supports the indicating member 50, the adjustment member 52 and the moving member 54 about the indicator pivot axis A2. As seen in FIG. 10, the indicator pivot axis A2 is offset from the winding pivot axis A1 of the shifter housing 24 on which the winding member 32 is pivotally supported relative to the shifter housing 24.

Figure 2:
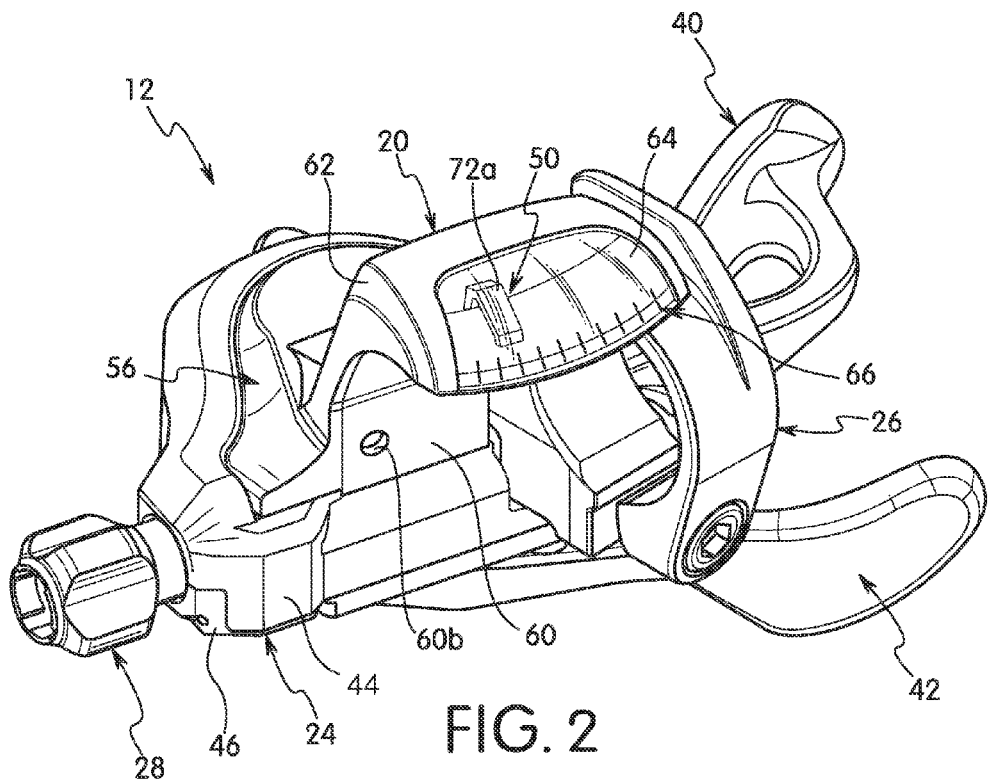
FIG. 2 is a top perspective view of the right bicycle shifter illustrated in FIG. 1.

As seen in FIGS. 2 to 4, the indicator lens 64 includes a transparent viewing window for viewing the indicating member 50. Preferably, indicia or indicator markings are provided on at least one of the indicator base 60, the indicator cover 62 and the indicator lens 64 to indicate the possible gear position. For example, the indicator markings can be simply dots or lines. Alternatively, the indicator markings can be more descriptive such as letters (e.g., "H", "M" and "L") or numbers (e.g., "1", "2", "3", etc.). In the illustrated embodiment, indicia or indicator markings 66 are provided on the indicator lens 64.

As seen in FIG. 8, in the illustrated embodiment, the indicating member 50 includes a mounting portion 70 and an indicating portion 72. The mounting portion 70 and the indicating portion 72 are integrally formed as a one-piece, unitary member. The indicating member 50 is preferably made of a hard, rigid material such as a rigid plastic material. In the illustrated embodiment, the indicating member 50 is formed by injection molding.

The indicating portion 72 is a curved member that extends upward from the mounting portion 70 and forms a pointer. A free end 72a of the indicating portion 72 is viewable through the transparent viewing window of the indicator lens 64. The free end 72a of the indicating portion 72 aligns with the indicator markings on the indicator base 60 to indicate the possible gear position.

The mounting portion 70 includes an integrated tubular bushing 74 that extends downward and pivotally supports the moving member 54 such that the indicating member 50 can pivot on the indicator pivot axis A2 relative to the moving member 54 by using the adjustment member 52 as discussed below. The mounting portion 70 also includes an abutment 76 on its bottom surface for limiting relative pivotal movement of the indicating member 50 relative to the moving member 54 on the indicator pivot axis A2.

The moving member 54 will now be discussed in more detail. Basically, the moving member 54 movably supports the indicating member 50 such that the indicating member 50 moves as the moving member 54 moves in response to movement of the winding member 32. The moving member 54 includes a support body 80 having a connecting member 82 that is connected to the winding member 32. The connecting member 82 is, for example a pin having its axis offset from the indicator pivot axis A2. The connecting member 82 of the moving member 54 is disposed in the groove 36a of the control plate 36 such that pivotal movement of the winding member 32 pivots the moving member 54 about the indicator pivot axis A2. Thus, the moving member 54 moves in response to movement of the winding member 32 and as a result also moves the indicating member 50 to a new gear indicating position. The support body 80 of the moving also includes a pair of trunnion supports 84 for supporting the adjustment member 52 as discussed below.

Figure 13:
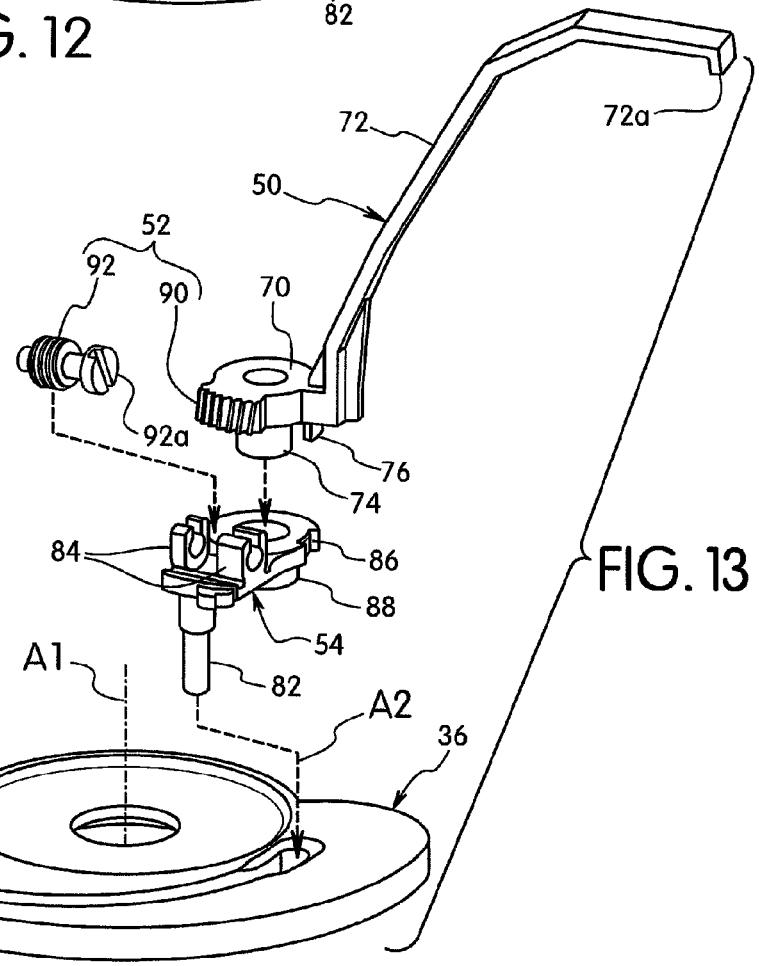
FIG. 13 is an exploded perspective view of the control plate of the winding member and the selected parts of the indicator unit illustrated in FIG. 12.
Figure 14:
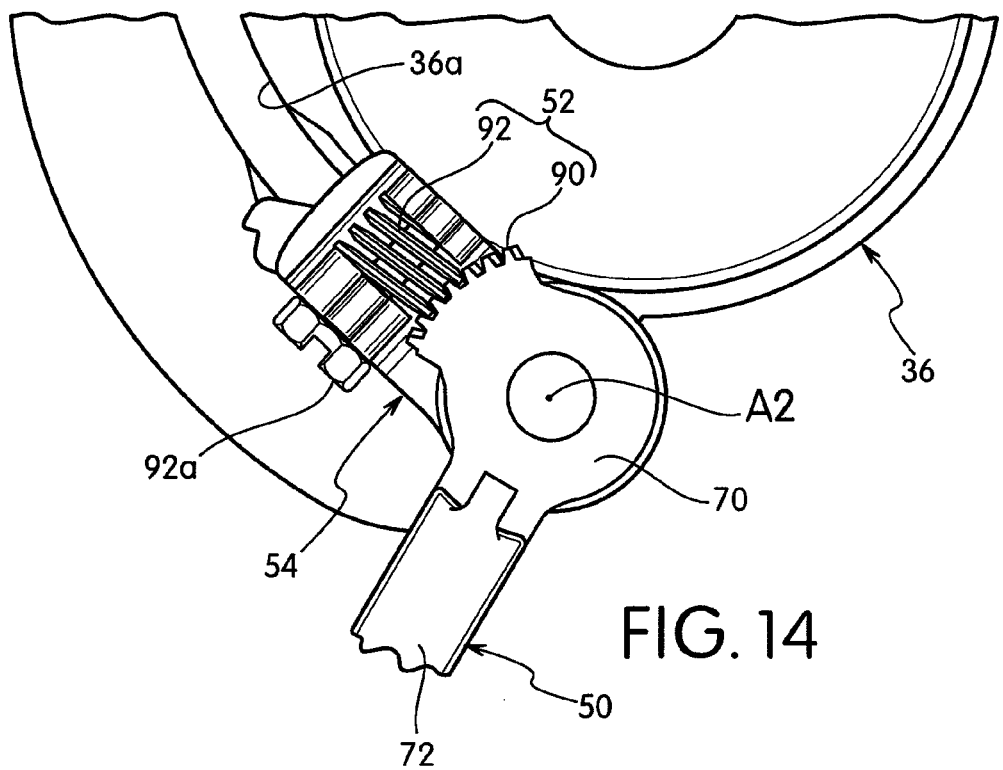
FIG. 14 is a partial top plan view of the control plate of the winding member and the adjustment member of the indicator unit in FIGS. 8 to 13.
Figure 15:
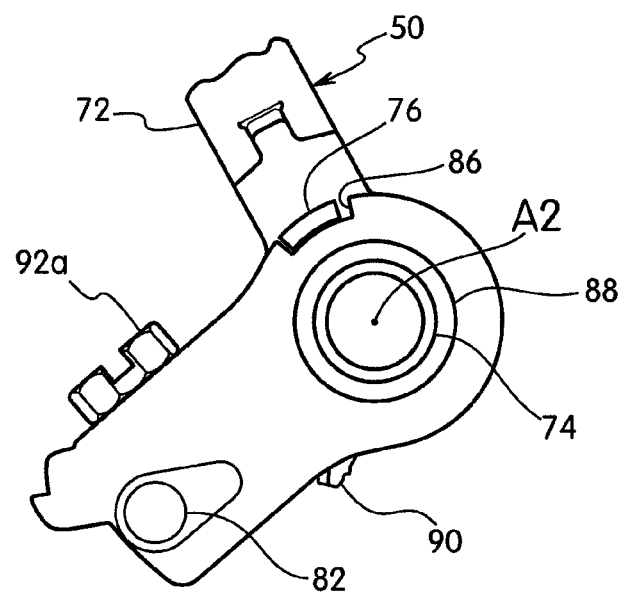
FIG. 15 is a partial bottom plan view of the adjustment member of the indicator unit in FIGS. 8 to 14.

As best seen in FIGS. 13 and 15, the support body 80 of the moving member 54 further includes a cutout 86 that receives the abutment 76 for limiting relative pivotal movement of the indicating member 50 relative to the moving member 54 on the indicator pivot axis A2. Thus, the indicating member 50 is pivotally supported on the moving member 54 to pivot on the indicator pivot axis A2 relative to the moving member 54 within a limited predetermined range of movement. The adjustment member 52 adjustably maintains the position of the indicating member 50 within the predetermined range of movement as discussed below.

As best seen in FIGS. 8, 13 and 15, the support body 80 of the moving member 54 further includes an integrated tubular bushing 88 extending from the bottom of the support body 80. The integrated tubular bushing 88 pivotally receives the integrated tubular bushing 74 of the indicating member 50 to pivotally support the indicating member 50 and the moving member 54 on the support post 62a of the indicator cover 62.

The adjustment member 52 adjusts a position of the indicating member 50 relative to the winding member 32. In particular, the adjustment member 52 provides for a fine adjustment of the indicating member 50 while the winding member 32 is in a stationary position. The amount of fine adjustment is preferably less than the amount of movement of the indicating member 50 between two adjacent gear indicating positions (i.e., two adjacent indicator markings 66 that correspond to two consecutive gears). Thus, the adjustment member 52 is used to align the indicating member 50 with one of indicator markings 66.

The adjustment member 52 is mounted on the moving member 54. In particular, the adjustment member 52 includes a worm drive that includes a worm gear 90 (a first adjustment portion) and a worm 92 (a second adjustment portion). In the illustrated embodiment, the worm gear 90 is integrally formed with the indicating member 50 as a one-piece, unitary member. However, the worm gear 90 can be a separate member that is attached to move with the indicating member 50 as needed and/or desired. In any case, the worm gear 90 is fixed to the indicating member 50 to move therewith. The worm 92 is rotatably mounted on the moving member 54 by the trunnion supports 84. In the illustrated embodiment, the worm 92 is snap-fitted into the trunnion supports 84, which are C-shaped members. The teeth of the worm gear 90 engage the worm 92 such that rotation of the worm 92 rotates the worm gear 90. As a result of the rotation of the worm gear 90, the indicating member 50 will rotate relative to the moving member 54. The worm 92 is provided with a tool engagement part 92.*a* (e.g., a head with a tool slot) for rotating the worm 92, and thus, adjusting the position of the indicating member 50. The tool engagement part 92*a* is arranged relative to the access opening 60*b* of the indicator base 60 so that the tool engagement part 92*a* is accessible through the access opening 60*b* while the winding member 32 is in at least one rotational position. In the illustrated embodiment, the tool engagement part 92*a* is accessible through the access opening 60*b* while the winding member 32 is in a fully released position. In this way, the position of the indicating member 50 can be easily adjusted without disassembling either the indicator housing 56 or the shifter housing 24.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle shifter. Accordingly, these terms, as utilized to describe the bicycle shifter should be interpreted relative to a bicycle equipped with the bicycle shifter as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shifter comprising:
   a shifter housing;
   a winding member movably coupled to the shifter housing; and
   an indicator unit including
      an indicating member operatively and adjustably connected to the winding member,
      an adjustment member adjusting a position of the indicating member relative to the winding member; and
      a moving member operatively coupled to the winding member such that the moving member moves in response to movement of the winding member, the moving member movably supporting the indicating member, the adjustment member being mounted on the moving member, the moving member remaining rotationally fixed during adjustment of the position of the indicating member by the adjustment member.

2. The bicycle shifter according to claim 1, wherein the indicator unit is an integrated unit that is detachably and reinstallably coupled to the shifter housing.

3. The bicycle shifter according to claim 1, wherein the indicator unit further includes an indicator housing that supports the moving member, the indicating member and the adjustment member.

4. The bicycle shifter according to claim 3, wherein the indicator housing having an access opening that is located such that the adjustment member can be operated from outside of the indicator housing via the access opening such that the position of the indicating member is adjusted.

5. The bicycle shifter according to claim 3, wherein the indicator housing has a connection opening through which the moving member is operatively coupled to the winding member.

6. The bicycle shifter according to claim 1, wherein the adjustment member includes a worm drive.

7. The bicycle shifter according to claim 6, wherein the worm drive includes a worm gear fixed to the indicating member and a worm rotatably mounted on the moving member.

8. The bicycle shifter according to claim 1, wherein the indicator housing pivotally supports the moving member about an indicator pivot axis.

9. The bicycle shifter according to claim 8, wherein the indicating member is pivotally supported on the moving member to pivot on the indicator pivot axis relative to the moving member within a predetermined range of movement, and
the adjustment member maintains the position of the indicating member within the predetermined range of movement.

10. The bicycle shifter according to claim 9, wherein the moving member includes a connecting member that is connected to the winding member, the connecting member being offset from the indicator pivot axis.

11. The bicycle shifter according to claim 8, wherein the shifter housing pivotally supports the winding member about a winding pivot axis that is offset from the indicator pivot axis.

12. The bicycle shifter according to claim 1, wherein the adjustment member includes first and second adjustment portions, the first adjustment portion being integrally firmed with the indicating member as a one-piece unitary member, and the second adjustment portion being movable relative to the indicating member.

13. The bicycle shifter according to claim 12, wherein the first and second adjustment portions rotate together about an indicator pivot axis in response to movement of the winding member.

14. The bicycle shifter according to claim 12, wherein the second adjustment portion is mounted on the moving member.

15. The bicycle shifter according to claim 1, wherein the indicating member includes an abutment, the moving member includes a cutout, and the cutout receives the abutment to limit pivotal movement of the indicating member relative to the moving member.

16. The bicycle shifter according to claim 15, wherein relative movement exists between the indicating member and the moving member only during adjustment of the position of the indicating member via the adjustment member.

17. The bicycle shifter according to claim 1, wherein relative movement exists between the indicating member and the moving member only during adjustment of the position of the indicating member via the adjustment member.

18. A bicycle shifter comprising:
a shifter housing;
a winding member movably coupled to the shifter housing, the winding member including a control plate with a groove; and
an indicator unit including
an indicating member operatively and adjustably connected to the winding member,
an adjustment member adjusting a position of the indicating member relative to the winding member, and
a moving member operatively coupled to the winding member such that the moving member moves in response to movement of the winding member, and movably supporting the indicating member, the moving member including a connecting member that is connected to the winding member,
the indicator housing pivotally supporting the moving member about an indicator pivot axis, the connecting member being offset from the indicator pivot axis, the connecting member of the moving member being disposed in the groove of the control plate such that pivotal movement of the winding member pivots the moving member about the indicator pivot axis,
the indicating member being pivotally supported on the moving member to pivot on the indicator pivot axis relative to the moving member within a predetermined range of movement, the adjustment member maintaining the position of the indicating member within the predetermined range of movement.

* * * * *